US010125893B2

United States Patent
Lucchesi et al.

(10) Patent No.: US 10,125,893 B2
(45) Date of Patent: Nov. 13, 2018

(54) ACTUATING SYSTEM FOR A QUARTER-TURN ROTARY VALVE

(71) Applicant: VELAN ABV S.R.L., Porcari (LU) (IT)

(72) Inventors: Nicola Lucchesi, Lucca (LU) (IT); Andrea Rindi, Sesto Fiorentino (FI) (IT); Luca Pugi, Poggio a Caiano (PO) (IT); Giovanni Pallini, Pontassieve (FI) (IT); Michele Graziani, Antraccoli (LU) (IT); Fabio Lapini, Pescia (PT) (IT)

( * ) Notice: Subject to any disclaimer, the term of this patent is extended or adjusted under 35 U.S.C. 154(b) by 0 days.

(21) Appl. No.: 15/509,007

(22) PCT Filed: Nov. 17, 2015

(86) PCT No.: PCT/IB2015/058891
§ 371 (c)(1),
(2) Date: Mar. 6, 2017

(87) PCT Pub. No.: WO2016/083943
PCT Pub. Date: Jun. 2, 2016

(65) Prior Publication Data
US 2017/0254439 A1    Sep. 7, 2017

(30) Foreign Application Priority Data

Nov. 26, 2014   (IT) ................ FI2014A0258

(51) Int. Cl.
*F16K 31/16* (2006.01)
*F16K 31/163* (2006.01)
(Continued)

(52) U.S. Cl.
CPC .......... *F16K 31/1635* (2013.01); *F15B 15/06* (2013.01); *F16K 31/563* (2013.01)

(58) Field of Classification Search
CPC .. F16K 31/465; F16K 31/122; F16K 31/1221; F16K 31/1225; F16K 31/1635; F16K 31/563; F15B 15/06
(Continued)

(56) References Cited

U.S. PATENT DOCUMENTS 3,267,816 A    8/1966  Graham
4,225,110 A *  9/1980  Akkerman ............. F15B 15/06
                                            251/229
(Continued)

FOREIGN PATENT DOCUMENTS

DE    1750935    4/1971
EP    1903198    3/2008
GB    2303407    2/1997

*Primary Examiner* — Matthew W Jellett
(74) *Attorney, Agent, or Firm* — Themis Law

(57) ABSTRACT

A device for controlling the opening and the closure of a valve includes rotatable element configured to control the position of the rotary valve on the basis of its rotation in a direction or in the opposite direction; and a system that causes the rotation of the rotatable element and includes two antagonist feeder conduits that generate a linear motion. The rotatable element is shaped as a pulley and the system that causes the rotation further includes a wire anchored to the pulley and to the feeder conduits to cause the rotation in a direction or in the opposite direction of the pulley based on the application of a pre-determined traction on the wire obtained through the linear motion generated by the feeder conduits.

11 Claims, 14 Drawing Sheets

(51) Int. Cl.
*F16K 31/56* (2006.01)
*F15B 15/06* (2006.01)

(58) Field of Classification Search
USPC .................................. 251/62, 294; 92/137
See application file for complete search history.

(56) References Cited

U.S. PATENT DOCUMENTS

| | | | | |
|---|---|---|---|---|
| 4,295,630 | A | * | 10/1981 | Card .................... F15B 20/005 251/14 |
| 5,007,330 | A | * | 4/1991 | Scobie .................. F15B 15/125 277/589 |
| 5,601,110 | A | * | 2/1997 | Rembert ............... F15B 15/261 137/316 |
| 2007/0042697 | A1 | | 2/2007 | Stout |
| 2011/0174097 | A1 | * | 7/2011 | Bergamasco ....... F16H 19/0622 74/89.22 |

* cited by examiner

ACTUATING SYSTEM FOR A QUARTER-TURN ROTARY VALVE

TECHNICAL FIELD

The present invention concerns the technical field relative to the valves for the delivery control of a fluid in a circuit and the relative actuators foreseen for the actuation of the valve.

In particular, the invention refers to a new type of actuator for valve, for example quarter-turn valves such as ball valves and throttles, which results to be very efficient and reactive and therefore particularly indicated for all the applications in which a control of the fluid is required varying the position of the plug.

BACKGROUND ART

Various types of valve systems have long been known which control the passage of an incoming fluid towards containers or along circuits in general. Naturally, also known are the relative actuating systems that allow the activation and the management of the sections of passage in all the intermediate positions between the "completely open" status and the "closed" status.

The actuators currently employed in applications of control of flow with quarter-turn valves are constituted by a crank and slotted link mechanism, which converts a linear motion in a quarter-turn rotary motion. The trigger of the linear motion takes place by injection of air or oil in a chamber of a cylinder connected to the crank and slotted link. In many cases, a spring assembly is also inserted, also connected to the crank and slotted link and employed for guaranteeing a safety position in case a breakdown of either the electrical or pneumatic/hydraulic feeding is verified.

The simplicity and the robustness of the crank and slotted link actuator have rendered the most widespread system as far as the actuation of shut-off valves (on-off) is concerned.

On the contrary, a crank and slotted link conversion system has absolutely inadequate features in terms of precision of control, linearity, absence of clearances in stroke. These features, in part negligible in an on/off valve, result to be determining in a control valve, that is a valve with which the width of the section of passage wants to be controlled with precision in such a way as to control the fluid flow rate inside the circuit.

The present invention wants to overcome the limits of the current state of the art, by introducing an actuator capable of lengthening the life in exercise of the plants and for the minimization of the maintenance interventions. All this implies the need to improve the performance of such apparatuses, therefore to reduce the possibility of formation of clearances and lower the contribution of the friction forces.

The best way to increase the efficiency of such actuators is to linearize the gear ratios of the actuating torques, a feature that is always desirable for any mechanical system.

A type of actuator capable of satisfying at least in part said requisite is, for example, described in patent publication U.S. Pat. No. 3,267,816.

The system takes advantage of the sending in pressure of fluid, for example oil, in order to move pistons.

In particular, such a type of actuator is in a box-like shape and foresees a receiving chamber 13 inside of which a rotatable shaft 50 is passing on which a crown gear 14 is connected. Such a chamber 13 is in fluid communication with two conduits placed between them in parallel and inside of which, in each one, a double-effect sliding piston (pistons 15 and 16) is foreseen. The two pistons work in an antagonist manner. Each conduit, thanks to the presence of the sliding pistons, results to be subdivided into two parts, one that is addressed towards the chamber 13 and the other one that is addressed towards a source of fluid in pressure.

The pistons are then connected between them through a chain that engages with the crown gear connected around the rotatable shaft.

In such a manner, a translation of a piston, through the sending of oil in pressure, allows to drag in translation also the other piston and, consequentially, the chain put in motion causes the rotation of the crown gear.

The rotation of the crown gear, in turn, determines the rotation of the shaft on which it is connected.

The shaft is naturally connected to the valve in such a way that its rotation in a direction determines its opening, while a rotation in the opposite direction determines its closure.

In this way, therefore, the controlled inlet of oil in pressure in a conduit or in the other one allows to control an opening/closure of the valve system to which such a controller is associated.

However, this solution is not exempt from technical problems.

In the first place, a chain gear system is used. Such a solution, in general, is unreliable in time since the chain links of the chain can wear until breaking or can modify their reciprocal distances or sizes. In that case, a perfect grip would not be guaranteed anymore between the teeth of the gear and the space of the link inside of which the tooth of the crown has to be inserted. For that reason, it is possible to have a malfunctioning condition, efficiency losses and even a total block of the valve due to the breakage of the chain and/or of a crown tooth.

Further disadvantages linked to the use of a gear transmission are that of presenting a localized wear on a limited number of teeth and/or of an imprecision in the control deriving from the nature itself of the gear system used.

A further document is, for example, publication EP1903198 that describes a movement system in opening/closure of a throttle for the system of vehicle exhaust.

In this case, there is the need for moving the valve in opening and in closure through a mechanical system that is not cumbersome and that is unbound from the presence of low pressure. To this aim, an actuator in the form of a rotary electric engine is used which is installed at a distance with respect to a pulley on which the control axis of the rotation of the valve is connected. Such a pulley is brought in rotation through two wires that are fixed by an end to the pulley and by the other end to such a rotary engine. According to the rotation of the engine in a direction or in the opposite direction, such a rotation is transmitted through the wires to the pulley that thus rotating as well conducts the valve in opening and in closure.

The use of a rotary electric engine as actuator, in the place of the linear feeders, is not functional for different reasons.

There are, in fact, wear problems of the teeth, problems of recovery of the clearances and above all of encumbrance in the case of elevated torques. In many industrial applications, in fact, the value of the pair to transmit would not allow the use of such rotary engines.

In fact, in order to transmit relevant torques of opening, a direct application ("Direct-Drive") becomes necessary, with costs and sizes that are probably unacceptable. Alternatively, a further reduction stage can be interposed between rotary engine and load, but also in this case there arise problems relative to the size of the reducer operating with very small rotations, inferior to the turn with consequent wear problems of the teeth and recovery of the clearances of the device. Further, the reducer interposed creates not insignificant problems.

A further document, which corresponds to the pre-characterizing part of the invention, is instead publication DE1750935, which describes two linear feeder conduits which generate an antagonist linear motion. The linear motion is then transmitted to a pulley on which a movement axis is connected that can be, for example, an axis of a valve. The gear takes place through a chain that engages in the pulley specifically teethed (therefore in the form of a sprocket), the whole with the same inconveniences already mentioned. In a variant, always of publication DE1750935, the use of a belt is described which however drags in rotation the pulley by friction. The text suggests, in fact, the use of friction gaskets that tend to increase the friction between the flat surface of the pulley and the belt, thus reducing the slidings.

It is evident, however, that such a solution is not functional since the belt anyway would tend to slip on the pulley, even if in a minimal way, therefore not guaranteeing a precision of movement of the valve. Moreover, such a solution requires often a registration of the belt in such a way as to guarantee always, during all the exercise, a fair coefficient of friction that eliminates any scraping. Last, being anyway the reciprocal sliding always present, this implies an early wear of the belt with a continuous need for maintenance/substitution of the same.

DISCLOSURE OF INVENTION

It is therefore the aim of the present invention to provide an actuating system for a valve that solves said technical inconveniences.

In particular, it is the aim of the present invention to provide an actuating system for a valve that results to be efficient and that reduces to the minimum the potential risks caused by an uncareful control of the position.

It is also the aim of the present invention to provide an actuating system for a valve that results to be also of simple maintenance.

It is also the aim of the present invention to provide an actuating system that with a minimal encumbrance allows to transmit high torques, the whole with great precision of movement of the valve, also in intermediate positions.

These and other aims are therefore reached with the present device (1) for controlling the position of a rotary valve, for example the opening and the closure and/or intermediate positions, preferably for a quarter-turn valve, as per claim 1.

Such a device (1) comprises:
A rotatable element (11) configured to control the position of the rotary valve on the basis of its rotation in a direction or in the opposite direction and;
Means (21, 22, 30, 50, 54, 52) to cause said rotation of the rotatable element (11), said means foreseeing two antagonist feeder conduits (2, 3) that generate a linear motion.

In accordance with the invention, such a rotatable element (11) is a pulley and said means (21, 22, 30, 50, 54, 52) the cause the rotation thereof further foresee a wire (21, 22) anchored to the pulley and also to said feeder conduits in such a way as to cause the rotation in a direction or in the opposite direction of the pulley in correspondence of the application of a pre-determined traction on the wire obtained through the linear motion generated by the feeder conduits.

The principle at the basis of the present invention is therefore that of employing a system with pulley and wires anchored to it, for the transformation of a linear motion, generated by two antagonist feeder conduits, in a rotary motion, preferably a quarter-turn one, in the two rotations.

In such a manner, all the technical inconveniences mentioned above are solved.

In particular, the reliability of the device is now improved since a chain gear is not used anymore and therefore there is no risk that the chain links can wear, breaking or modifying their reciprocal distances or the sizes. It is now guaranteed a correct functioning without risks of loss of efficiency or even of a total block of the valve.

Further, there is not the problem anymore of the localized wear of the teeth and therefore of imprecisions of functioning.

In particular, unlike DE1750935, the anchorage of the wire on the flat surface of the pulley avoids any scraping, therefore rendering the movement of the valve precise, and above all, increasing the life span of the belt itself.

With respect to document EP1903198, the use of linear actuators, at the place of a simple rotary actuator, allows to obtain torques in exit much higher with the same encumbrance and costs.

Further advantages can be deduced from the dependent claims.

BRIEF DESCRIPTION OF DRAWINGS

Further features and advantages of the present device 1, as per the invention, will result clearer with the description that follows of some embodiments, made to illustrate but not to limit, with reference to the annexed drawings, wherein:

FIG. 15 shows a graphics of course of the performances, highlighting a between and constant performance for the configuration opposed at 180° with respect to the configuration with arrangement of the feeder conduits parallel between them.

DESCRIPTION OF SOME PREFERRED EMBODIMENTS

Figure 1:
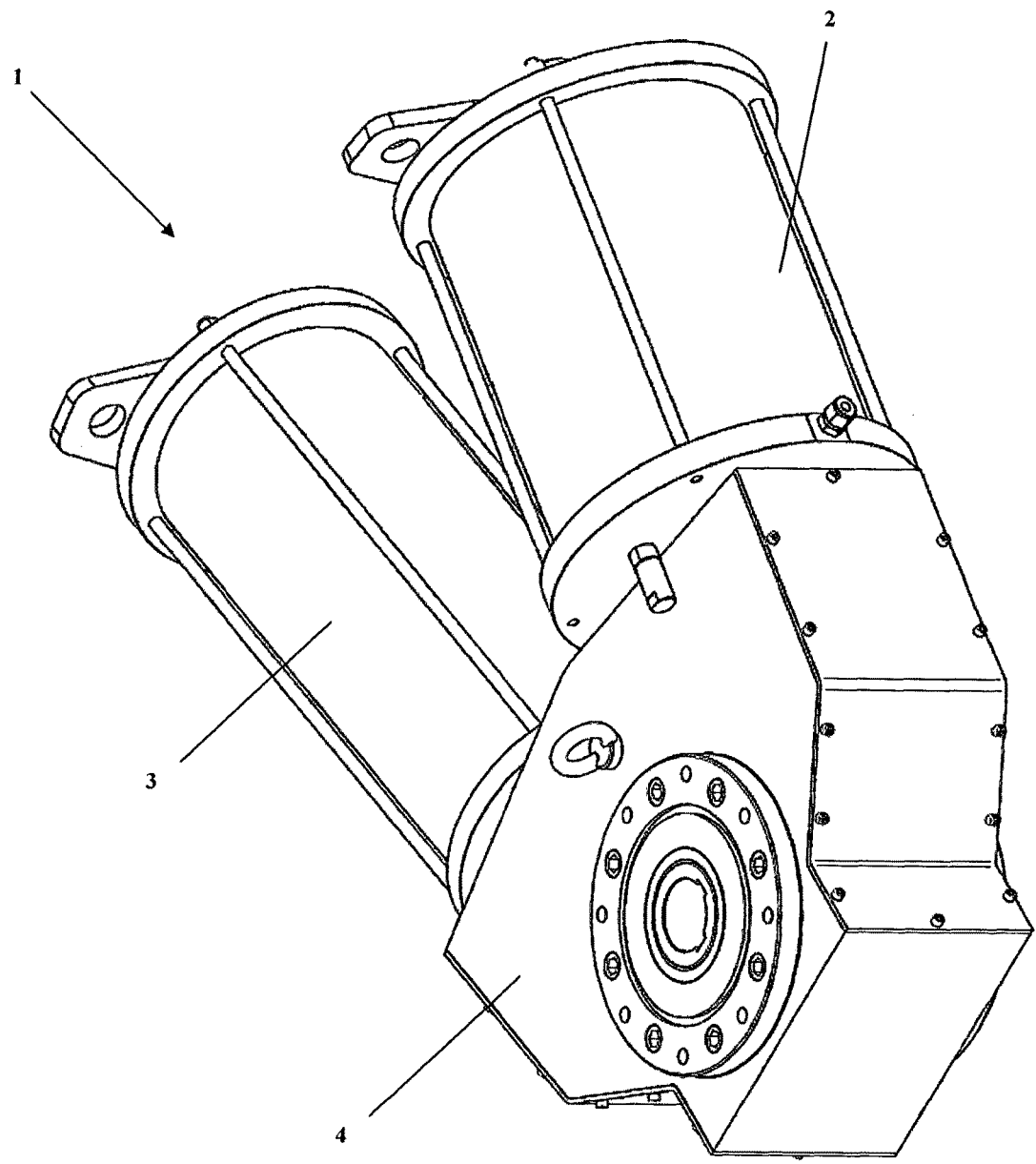
FIG. 1 and FIG. 2 show two axonometric views of the present device as per the invention.

The invention concerns a device 1 for controlling the position of a rotary valve, preferably a quarter-turn valve, and comprising:
A rotatable element (11) positioned in a housing 4 and configured to command the position of the rotary valve in the basis of its rotation in a direction or in the opposite direction; and Means (21, 22, 30, 50, 54, 52) to control said rotation of the rotatable element 11.

In accordance with the invention, such means (21, 22, 30, 50, 54, 52) foresee at least one wire (21, 22) cooperating with the rotatable element 11 in such a way as to cause the rotation thereof in a direction or in the opposite direction in correspondence of the application of a pre-determined traction on the wire.

More in particular, the rotatable element can be in the form of a pulley which is precisely cooperating with the wire.

The attached figures describe in detail the invention, as shown below.

In a first possible embodiment of the invention, the device foresees two conduits (2, 3) which have top plates (2', 3') and bottom plates (2", 3"). In a possible embodiment, bottom plates (2", 3") rest on housing 4 and the conduits (2, 3) are preferably placed at a pre-determined angle from each other. Such conduits contain the components for the production of the motion which work in antagonist manner one with respect to the other.

As better clarified below in the present description, the feeding that moves one of the internal elements to the conduits can be of the pneumatic or hydraulic type, while the antagonist one can be mechanical through compression of a spring assembly, like in the case illustrated below, or also of the pneumatic or hydraulic type in analogy with the primary one.

Figure 3:
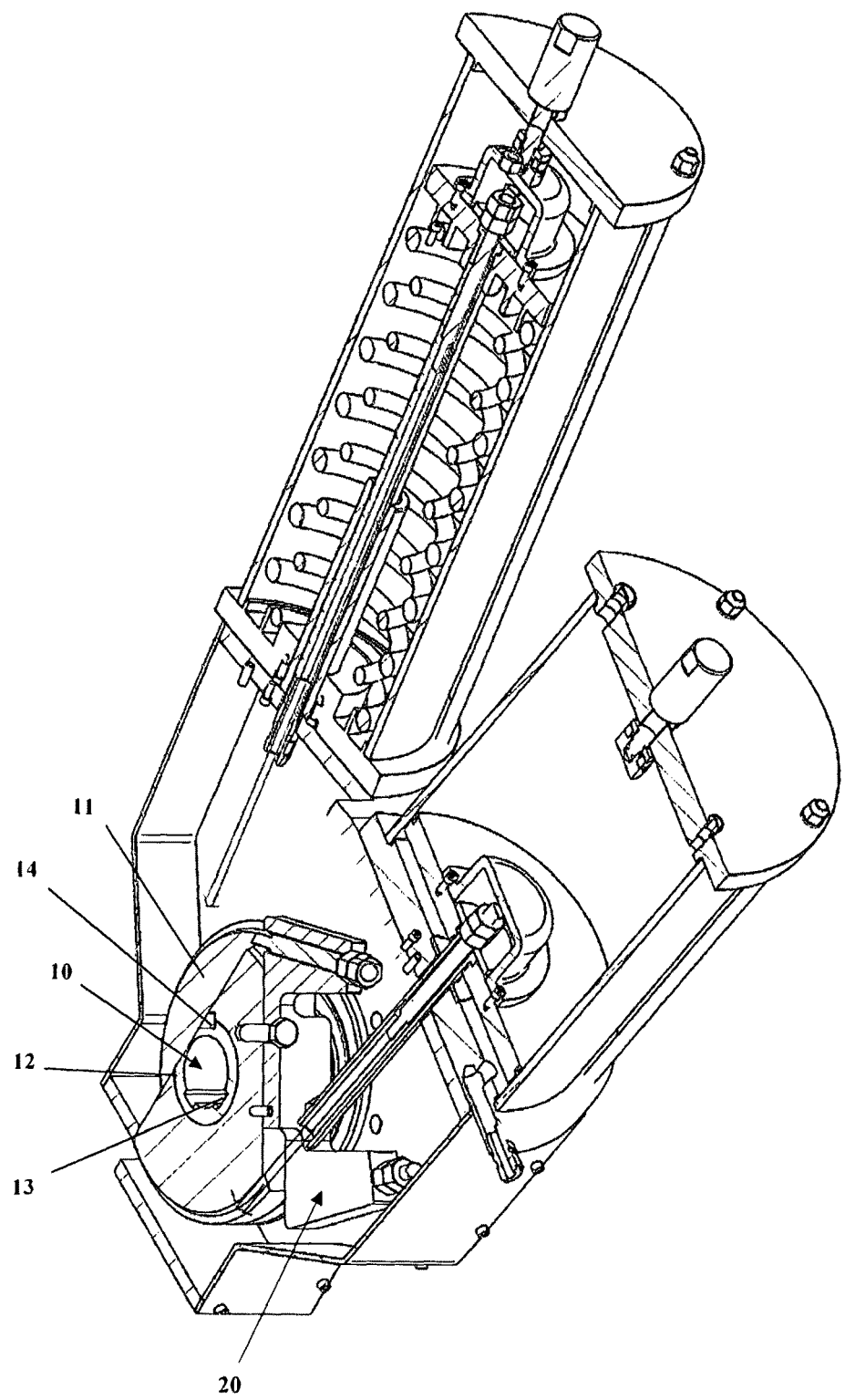
FIGS. 3 to 5 show sections relative to the present device as per the invention.

In particular, the two conduits, as it can be seen in the section of FIG. 3, have both a longitudinal axis that rests on a same section plane, but such axes are between them divaricated of a pre-determined angle.

Such divarication angle can be varied in order to optimize the overall encumbrance of the structure, adapting it to the available working spaces in which it will be installed.

The preferred angular range of divarication can be comprised between a minimum of 10 degrees and a maximum of 180 degrees, in which the two cylinders are perfectly aligned and opposed.

Naturally, inferior angles to the 90 degrees optimize the encumbrance.

Further, an embodiment with different angulations, for example with the two conduits placed side by side in a parallel way, would be anyway possible, without for this moving away from the present inventive concept.

Figure 2:
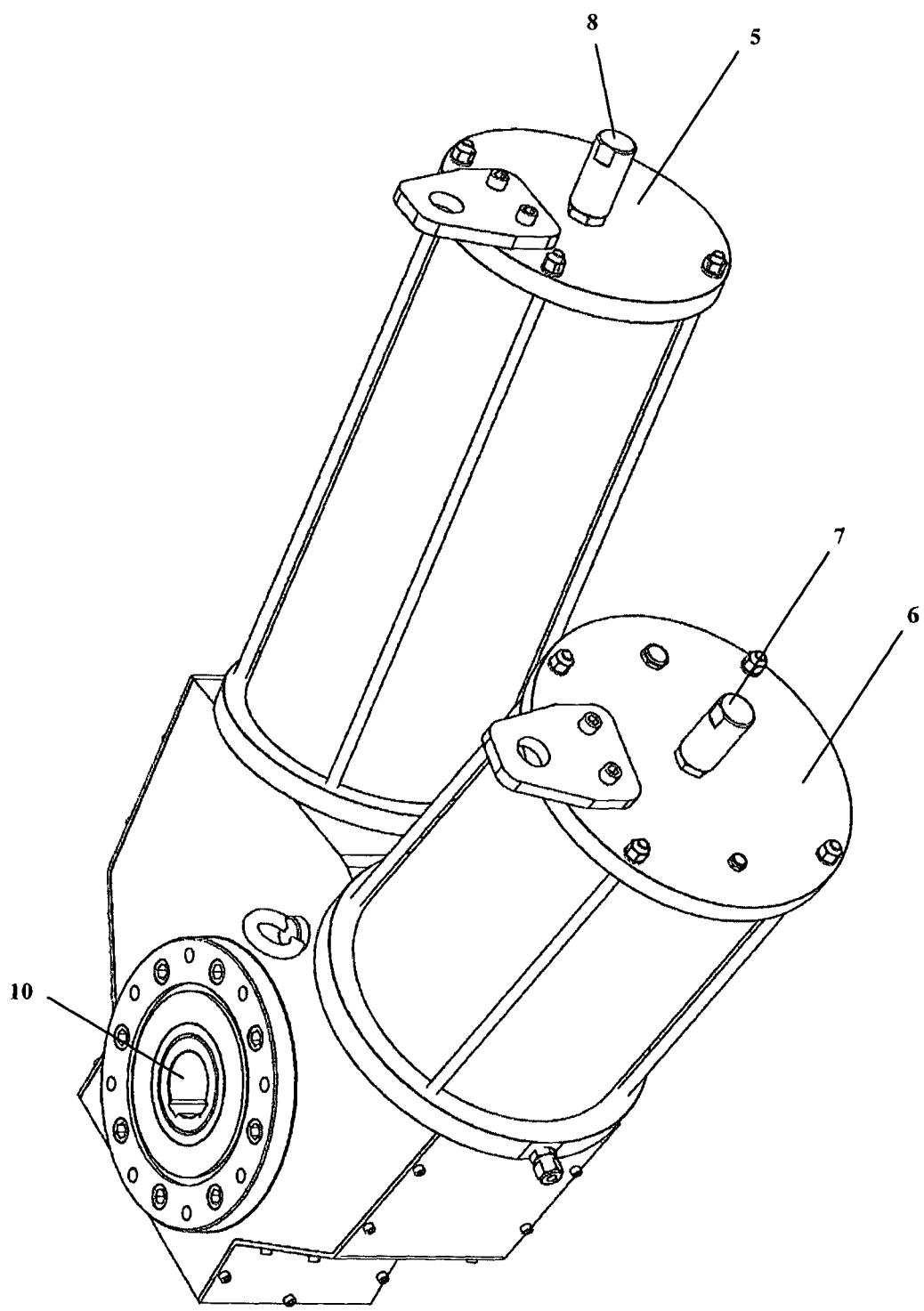

As also highlighted in FIG. 2, the two conduits are then closed by a closing plug 5 and 6 in the form of a disk, for instance (or other form).

The disk can, for example, result to be bolted to the wall of the conduit itself or, like in the case of the figure, longitudinal beams (in fact long screws) can be foreseen that depart from the base of the conduit. The disk foresees equivalent holes in such a way that the disk is inserted on the ends of the beams (shank of screw or bolt) until a stroke (not highlighted for simplicity purposes in the figures). At that point, the application, for example, of a ring and nut or of a nut and locknut is foreseen to make the tightening.

In accordance with this solution, a quick removal of the disks 5 and 6 can be obtained, to have an easy access inside the conduits, for example in case of maintenance.

Figure 7:
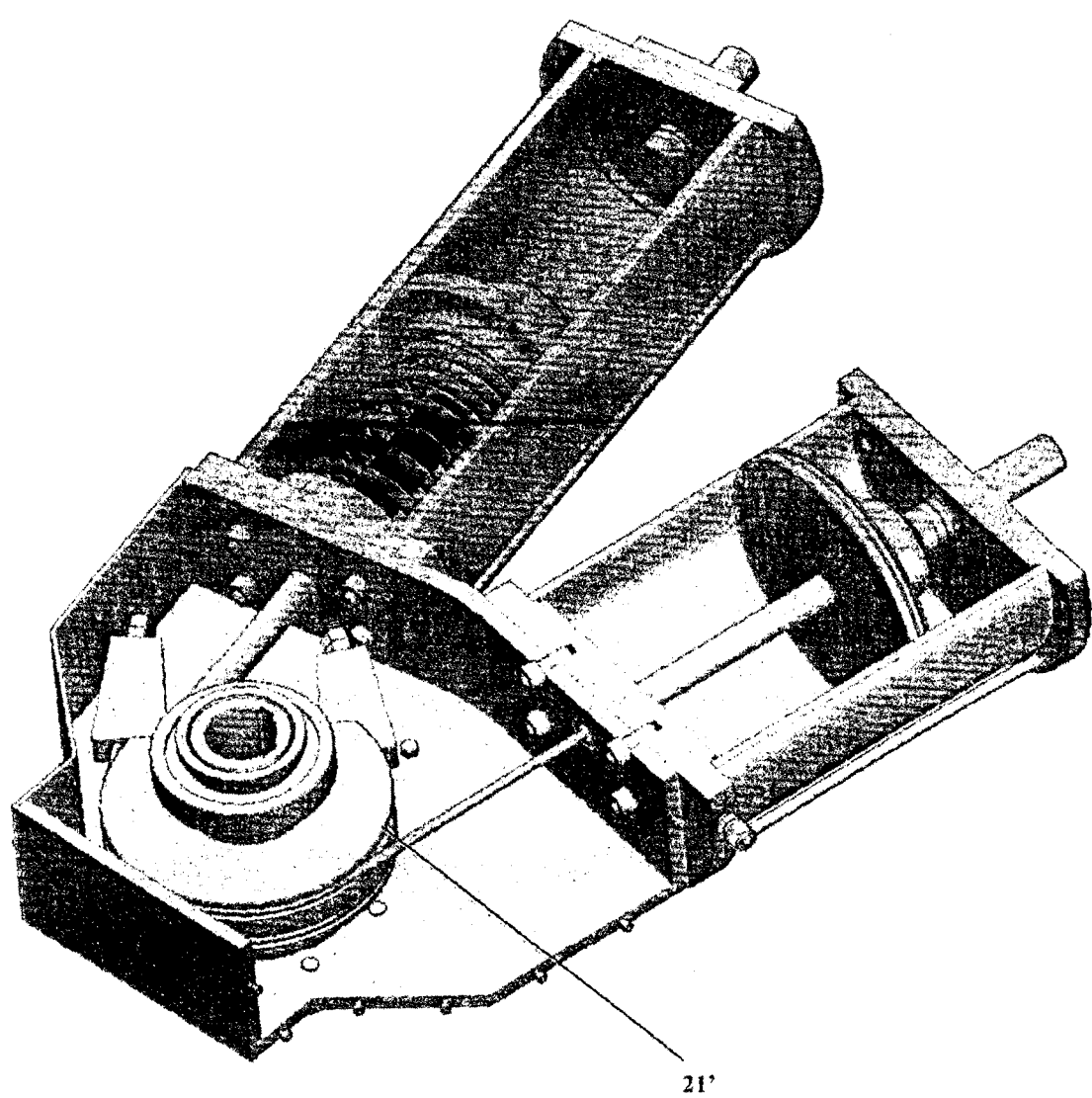

The closing plug (5, 6) foresees a pivot (7, 8) which extends inside of the conduit itself with a visible flat part also in FIG. 7 and whose function is that of representing a stroke for the excursion of the antagonist internal elements.

Inside the conduits the two antagonist elements are foreseen, as it is highlighted very well in the sections shown in the FIGS. 3 to 7.

In particular, as better clarified below in the present description, in the first conduit 2 a sliding septum 30 is foreseen which is mobile through the injection of a fluid in pressure in a direction (from the base of the conduit 2 towards the relative closing plug 6). In the other conduit 3, the antagonist element foresees always a sliding septum 52 and a spring assembly interposed between said septum 52 and the base 51 of the conduit. The two elements are antagonist since kinematically connected thanks to specific wires (one or more than one) that are further collaborating with a pulley 11 assembled rotatably. In this way, through the wire, the linear motion of the antagonist elements is transmitted to the pulley that rotates. Therefore, the injection of fluid in pressure in the space comprised between the septum 30 and the base of the conduit 2 lifts the septum towards the closing plug 6 and the wire, consequently, drags the septum 52 towards the base of the conduit 51, compressing the spring which, in turn, guarantees the return in initial position once the conduit is depressurized 2. During these translations the pulley rotates in a direction or in the other direction thanks to the specifically anchored (and/or specifically wrapped) wire around it.

Going further into the detail of the structural description of the invention, the two conduits result to be connected to a body 4.

The body 4 forms a containment box.

Figure 6:
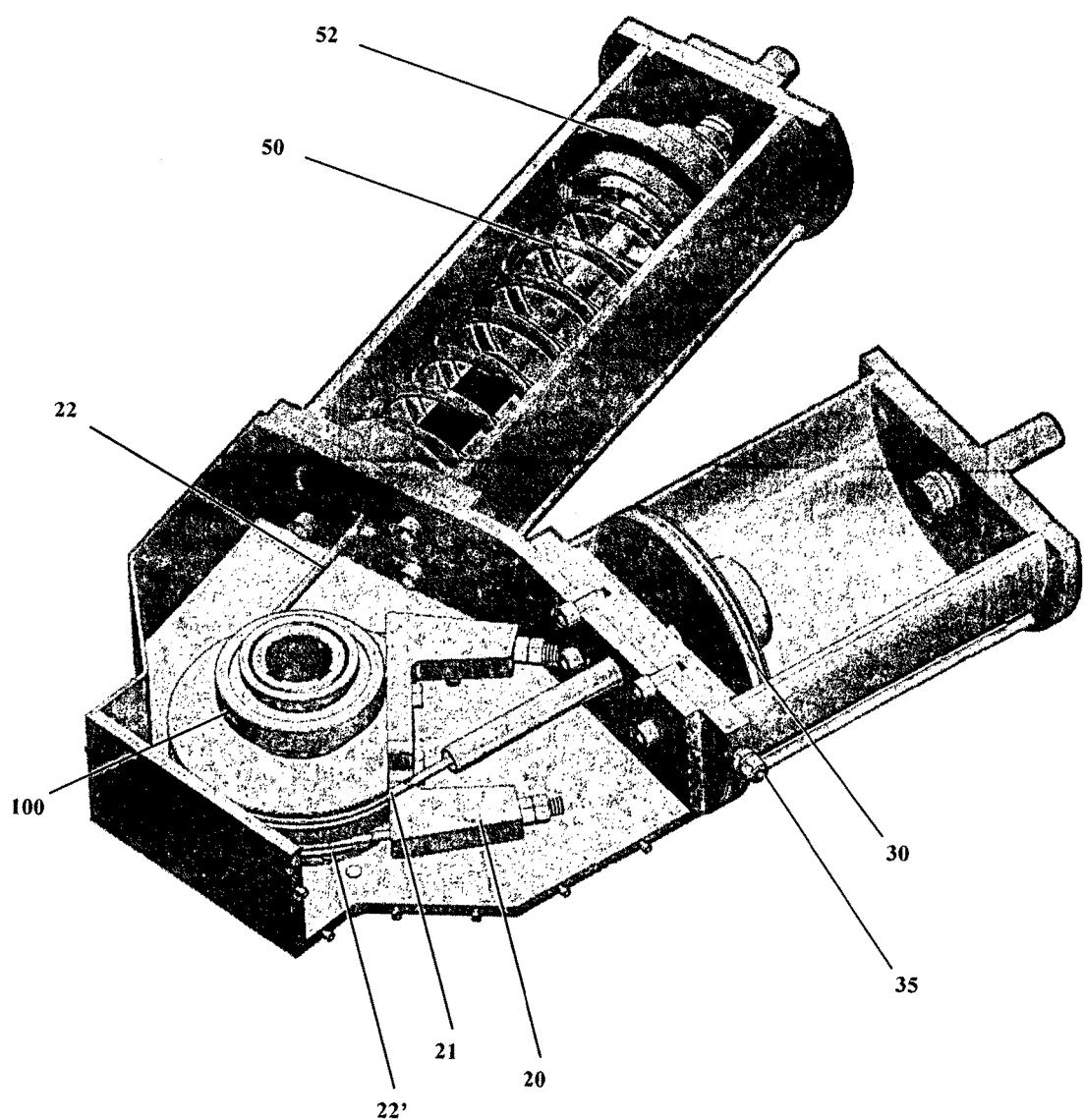
FIG. 6 and FIG. 7 show, in an axonometric view, a cross section of the device 1 to show the two "completely open" and "closed" statuses even if, naturally, the device is structured to occupy in a precise manner all the intermediate states between open and closed.

In particular, going to the section of FIG. 3, the containment box 4 foresees a disk 11 (in fact a pulley) axially holed in such a way as to form a conduit 10. As shown in FIG. 3, in such conduit 10 a bush 12 is lodged, rendered integral to the conduit 10 through an insertion 14. The bush has then a series of groove 13 to be able to bind rotationally the shaft that transmits the motion of opening and closure of the valve or the intermediate positions (not shown in figure for simplicity purposes). FIG. 6 and FIG. 7 show better such a pulley with the bush provided with grooves to bind rotationally the exiting shaft that controls the valve. When the disk 11 is conducted in rotation, also the shaft is dragged in rotation through the integral rotation of the bush 12 (bound precisely to the disk).

As will result clearer below in the present description, naturally the rotation of the disk 11 is controlled in such a way that in fact it oscillates of a certain angle from an initial position in a direction and, back to the initial position, oscillates in the opposite direction in such a way as to control the shaft in a partial clockwise and anti-clockwise rotation, therefore controlling the opening and the closure of the valve and/or intermediate positions.

In particular, the controllable angular excursion is equal to 90 degrees plus eventual extra stroke in the two directions comprised between the 5 and the 10°.

An axonometric view of the disk 11 is visible also in the axonometric FIG. 6 and in the axonometric FIG. 7.

It highlights the conduit 10 that emerges from the surface of the disk in such a way as to be bound to the external surface of the body 4 through traditional rotation bearings 100. In this way, the entire disk is bound rotationally to the frame 4.

Figure 8:
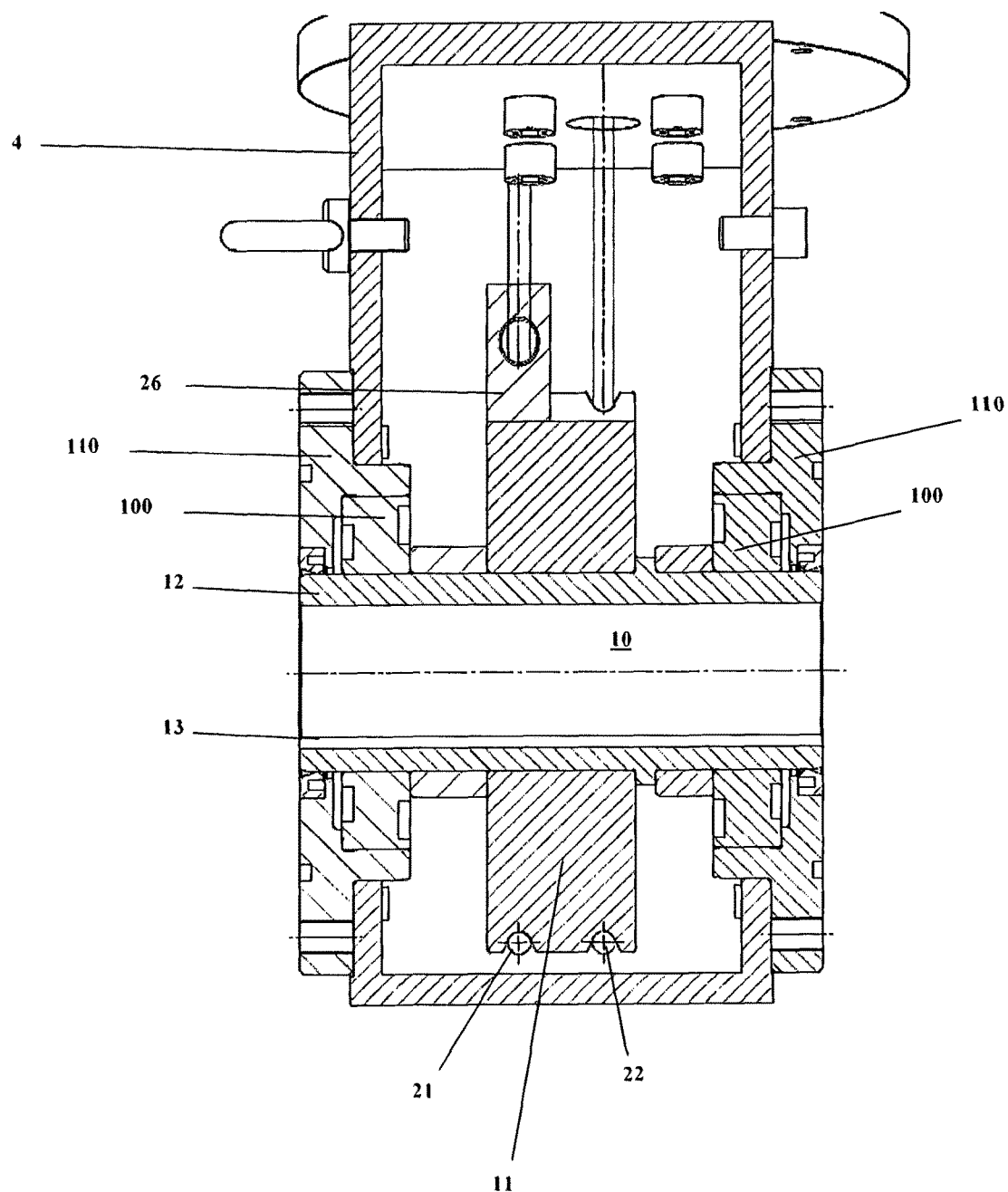
FIG. 8 is a section that describes in detail better the connection of the pulley 11 with the frame 4.

A further section is that of FIG. 8 which describes in detail the way of connecting kinematically the pulley 11 with the frame of the containment box 4. The figure shows always the passage of the wires 21 and 22 around the pulley, shows the rotation bearings 100 and the closing plugs 110 that block the pulley package to the structure 4.

Going on with the structural description of the invention, the disk 11, being in fact a pulley, forms throttles (21', 22') in which a wire passes (21, 22) for each throttle.

Each wire (21, 22) departs from an element placed inside a conduit (2, 3) and, through the throttle, wraps in part the pulley 11 until it blocks by the opposite end to a binding element 20 fixed in turn to the pulley itself.

FIG. 6 and FIG. 7 show very clearly such a binding element 20 and show how it is fixed to a smoothed face of the pulley.

Figure 4:
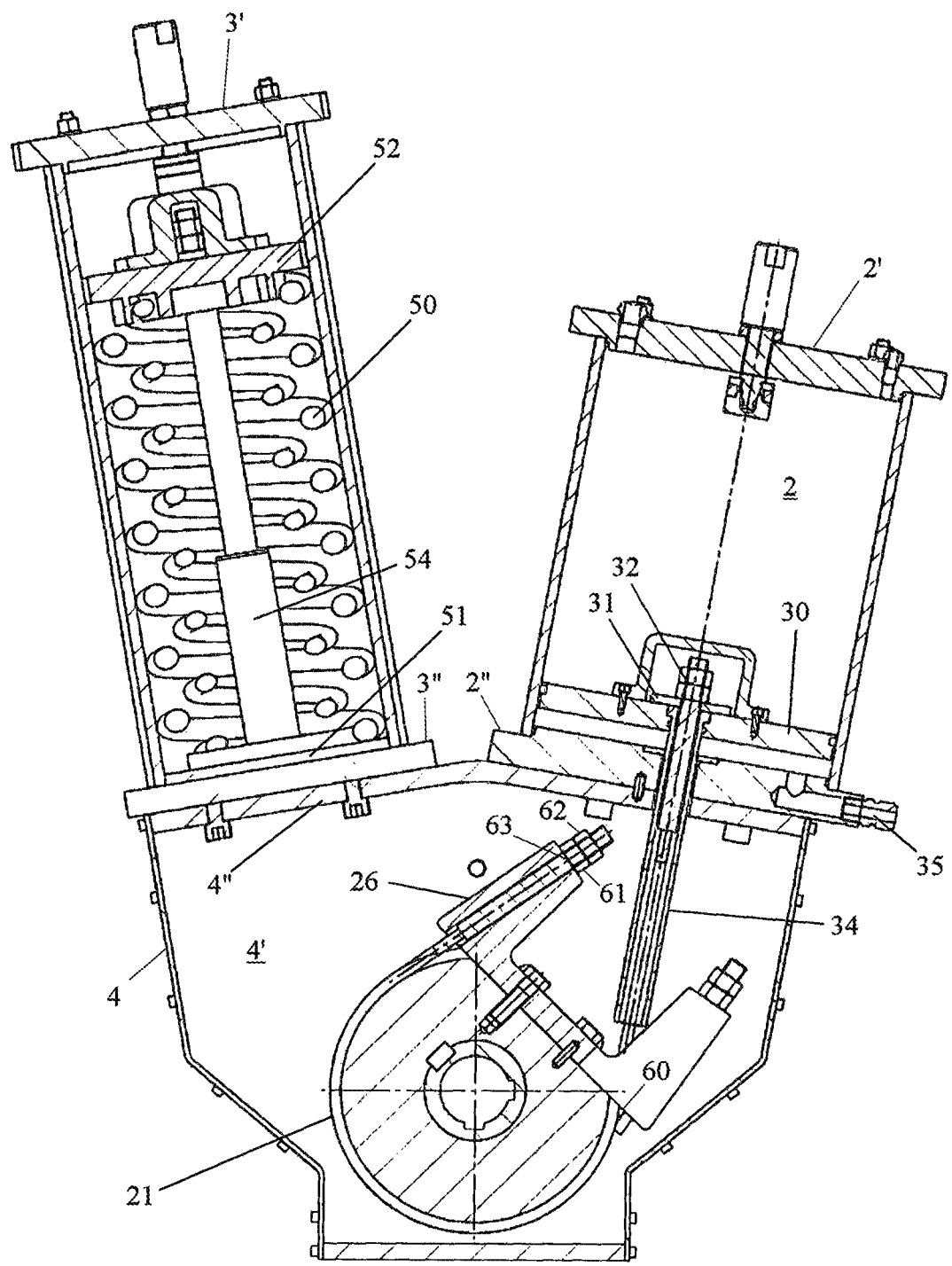
Figure 5:
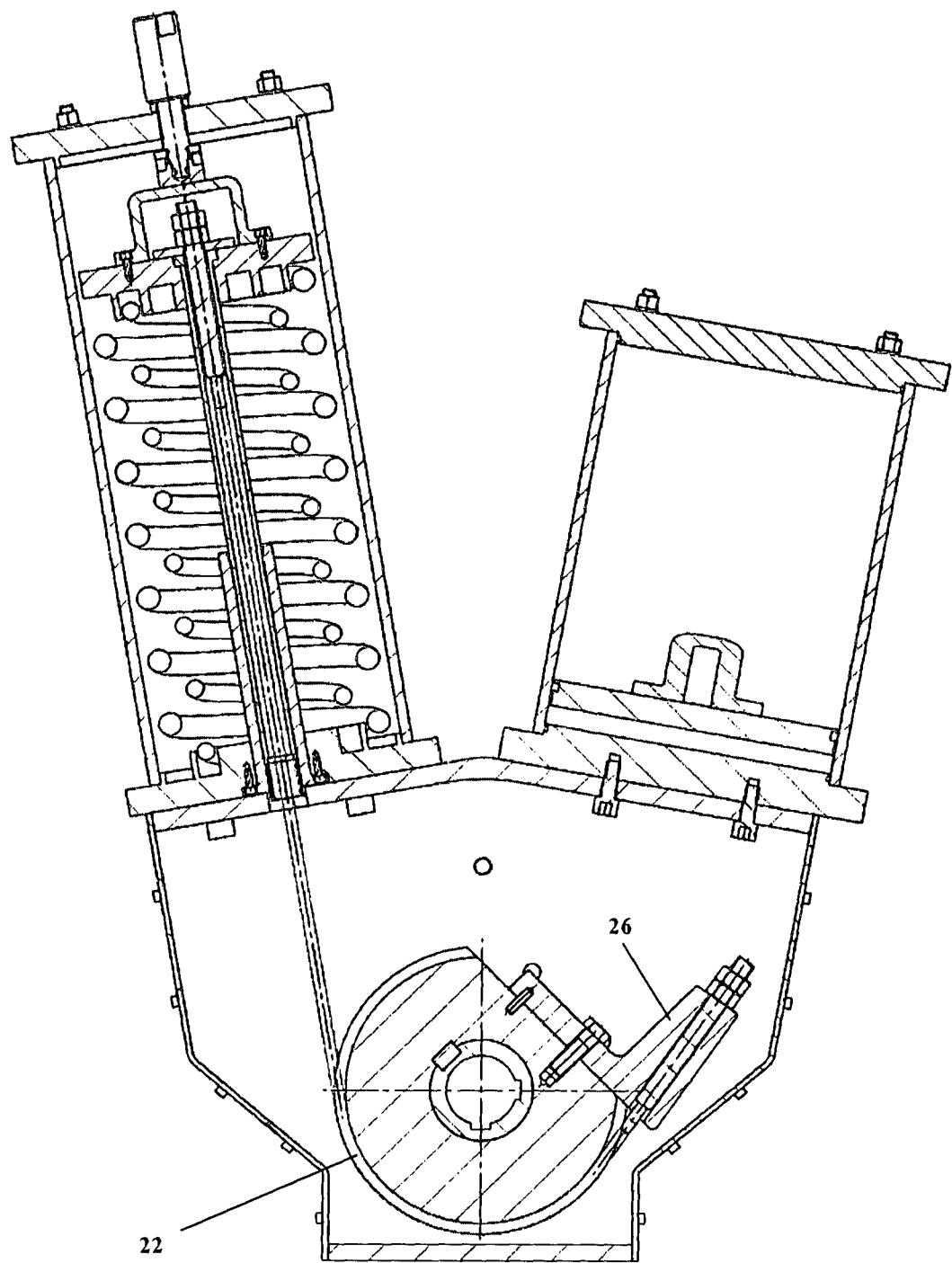

In particular, the sections of FIG. 4 and FIG. 5, for clarity purposes, separate the passage of the wire 21 from the passage of the wire 22 even if, naturally, it is to be intended that said two wires wrap contextually the disk 11.

In particular, the section of FIG. 4 shows the device 20 that forms an end 26 for the block of the end of the wire 21. The wire, wrapped around the disk 11 into the specific throttle obtained in the disk 11 itself, terminates on the mobile septum 30 arranged in the conduit 2.

The mobile septum 30 is therefore holed axially to allow the passage of the wire and its fixing through a plate 31 and nut and locknut 32. The wire is threaded on both ends.

The solution with nut and locknut is only one of the possible ways of fixing the end of the wire and has the advantage of allowing the recovery of the clearances through pre-tensioning of the wire.

FIG. 4 shows a wire guide 34 (visible also in FIG. 6), that in fact is in the form of a conduit inside of which the passage of the wire arranged precisely slidingly with respect to it takes place in part.

Always as shown in FIG. 4, an opening 35 is then foreseen that puts in communication the external with the internal part of the conduit 2 exactly below the mobile septum 30. In this way, through said opening 35, a fluid in pressure can be inserted, for example a gas or a liquid such as oil in pressure, so as to cause the reascent of said septum along the conduit 2.

The opening 35 can naturally be corredated with a specific valve for controlling the injection/exit of the fluid.

The conduit 3 is instead inside it corredated with specific elastic means 50, for example a spring 50 antagonist of the septum 30.

The spring rests, preferably fixed, by an end to the base 51 of the conduit 3 (the conduit 3 fixed to the body through screws or bolts in general). On the opposite part the spring is connected to a mobile septum 52.

In particular, the spring is pre-compressed between the base 51 of the conduit and the mobile septum 52.

As then shown always in section of FIG. 4, and more specifically in section of FIG. 5, a tubular conduit 54 is foreseen inside of which the second wire 22 passes that is connected to the mobile septum 52 through nut and locknut, in a similar way to the preceding one. In a similar way to the solution described for the connection of the wire 21, also in this case the opposite end of the wire 22 connects with an arm 26 of the bond 20.

The bond 20, therefore, which is applied to a smoothed face of the pulley, is generally in the form of two Ls placed between them one frontally to the other one and can be realized in a single piece or in two separate pieces.

Therefore, there is a flat part 60 that is fixed to the smoothed part of the pulley through screws or bolts in general. The two arms 26 present a passing hole 63 for allowing the passage of the ends of the wire and the block through nut 61 and locknut 62, as per FIGS. 4 and 5.

The internal volume 4' formed by the body 4 is isolated from the conduits 2 and 3 through a wall 4", except for the hole of passage of the wires, in particular except for the hole where the tubular conduits 34 and 54 of passage for the wires are lodged.

The conduit 34 penetrates in part inside the chamber 4' and seal elements are foreseen that isolate in fact such a chamber 4' and the conduit 2. In this manner, it is avoided that the fluid in pressure goes in inlet inside the chamber 4'.

In the solution with antagonist element in the form of spring, naturally, there is no need of seal elements in the hole of passage of the wire 22 that unites pulley with septum 52.

Unlike the system described in U.S. Pat. No. 3,267,816 in which fluid in pressure is injected in both the conduits and with all the chambers immersed in the fluid, now the use of the spring assembly in a conduit and a fluid in pressure in the other conduit substantially isolated from the chamber 4 gives further significant advantages.

In particular, there are no risks of corrosion or contamination of the rotatable element and the maintenance results to be overall much simpler.

Further, it is now foreseen an intrinsic safety valve state in case of loss of pressure, guaranteed by inserting the integrated spring assembly.

In the case of a variant in which also the antagonist element is in the form of a mobile septum through fluid in pressure, however, a restraint system can be thought of being applied similar to that applied to the conduit 2 as described above.

A variant of the invention, leaving as it is all that has been previously described, can foresee a single wire that is connected by its ends to the two septa (30, 52). The wire is preferably crushed in one of its contact areas with the pulley so as to create a wider surface. In this way, it can be fixed directly to the pulley through the insertion of a simple screw, a bolt, glues or anyway connection systems that fix directly the wire to the surface of the pulley.

This solution is very advantageous since it eliminates the use of the binding device 20 which is cumbersome, therefore saving a lot of dead spaces.

Further, a single wire is used, therefore the solution is structurally simple.

The same solution, which eliminates the bond 20, can anyway be obtained also with the use of two different wires, arranging an end of them preferably crushed that is fixed directly to the pulley with screws, bolts, glue and the like.

Regarding a description of functioning, it takes place in the following manner, with reference to the succession of FIGS. 6 and 7.

Starting from FIG. 6 we are in a condition of extended spring 50 and totally lowered septum 30. Through the valve 35 a fluid is injected, for example oil, air or gas in general, in the space interposed between the septum 30 and the base of the conduit 2. The septum 30 initiates to translate towards the cover 6, therefore causing the rotation of the rotatable element 11 thanks to the wire 21 of connection. The wire 21 wraps in part the pulley, passing in the own throttle 21', and being fixed to the pulley through the binding element 20, causes its rotation (in this case anti-clockwise as per FIG. 6). As a consequence of the rotation of the pulley, the septum 52, connected to the pulley 11 through the own wire 22, will be dragged in a translation motion that will compress the spring 50 exactly as shown in FIG. 7. Such a rotation motion of the pulley 11 will bring in rotation the axis (not represented in figure) that will control the opening or the closure of the valve.

Once the translations are completed the fluid is exhausted from the chamber 2 and therefore the spring 50 will have enough force as to initiate to translate the piston 52 in the original position (rest or minimum pre-load position of the spring of FIG. 6). In this phase, the motion of the septum 52 will make the pulley 11 counter-rotate thanks to the own connection wire 22. In this manner, a rotation is controlled in the opposite direction of the valve and the pulley 11 will drag through the wire 21 the other septum 30 in the initial position of FIG. 6, ready to start a new cycle.

In any case, the spring, preferably, remains always with a certain compression in order to guarantee a minimum pair.

The exclusive use of the spring 50 in the chamber 3 makes that the use of fluids in pressure is not necessary inside the chamber 3 itself, therefore simplifying significantly, in structural terms, the entire component even if, as said, solutions with an antagonist element different from the spring can be foreseen.

The use of the wire (in a generic sense) and of a sort of pulley 11 simplifies structurally the device and renders it above all more reliable.

In a variant of the invention, having said the above, the spring could be arranged between the septum 52 and the base 5, working in that case in traction.

Figure 13:
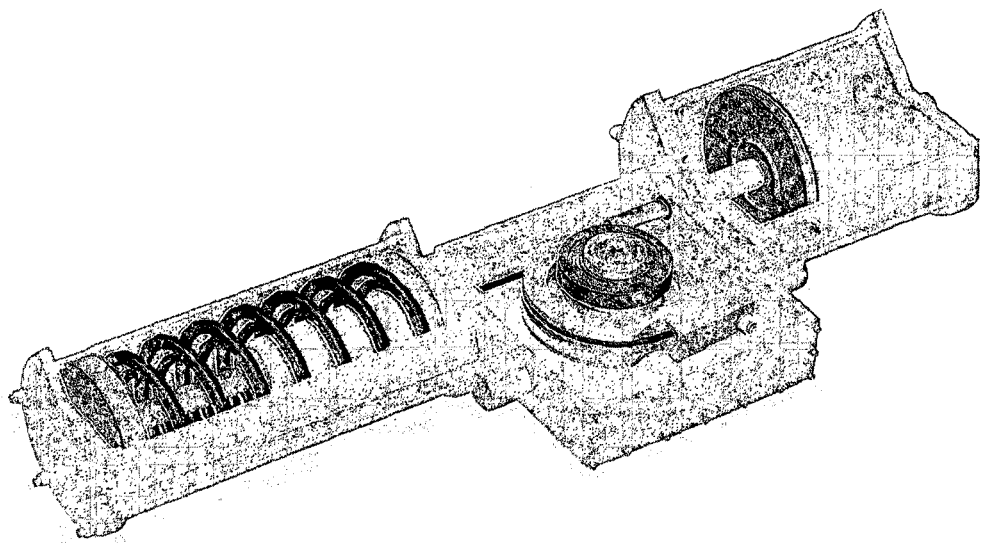
FIGS. 13 to 15 specify better the solution with arrangement of the feeder conduits of the linear motion between them opposed at 180°; in particular.
Figure 14:
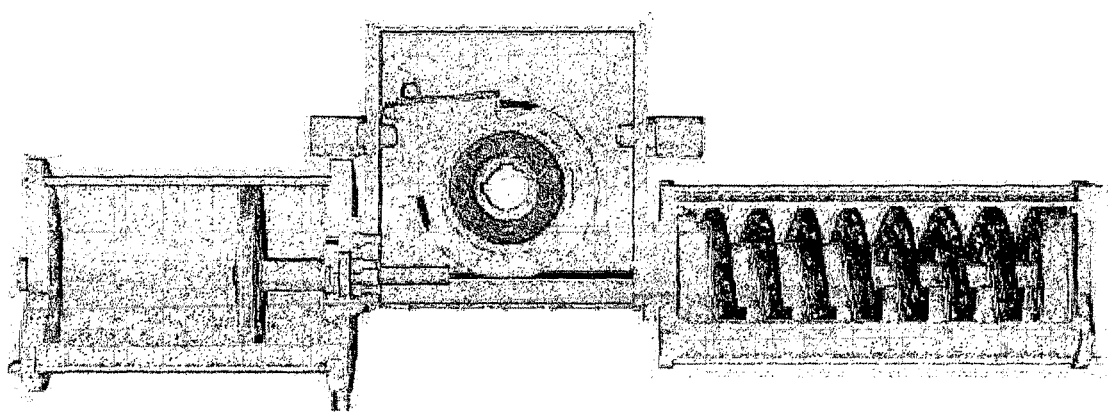

A preferred embodiment of the invention, better described in detail in FIGS. 13 and 14, is that relative to the arrangement of the conduits at 180°. Having said all the above, the pulley is always present having two throttles where a wire is lodged in each throttle. The first wire is fixed by an end to the septum of the feeder at fluid in pressure and by the opposite end to the pulley. In the same manner, the other wire is connected by an end to the septum relative to the conduit where there is the spring assembly and by the opposite end always to the pulley. The pulley is conformed to foresee a conduit where the threaded terminal of the wire is inserted, blocking it with nut and washer (constructive solution of the pulley valid also for all the other embodiments described).

Figure 15:
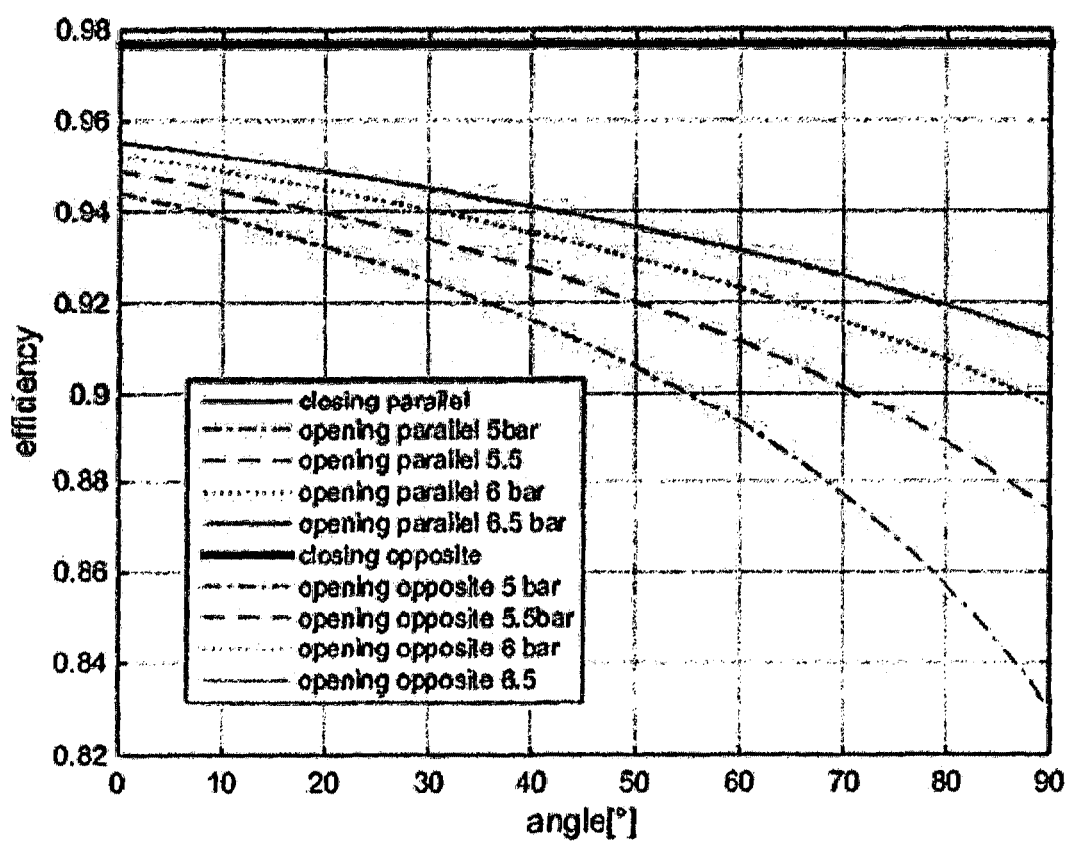
Figure 16:
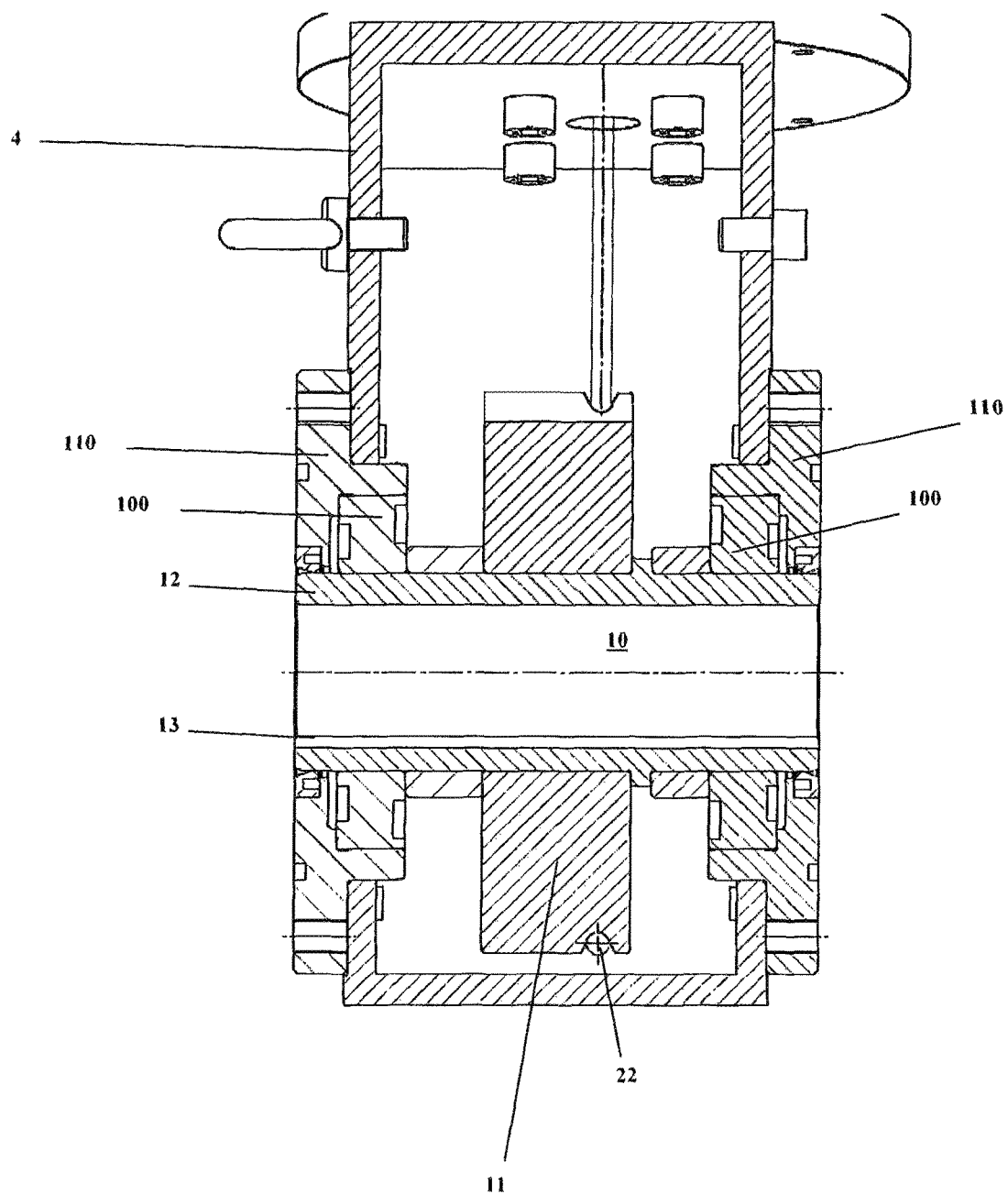
FIG. 16 illustrates an embodiment of the invention having a single wire.
Figure 17:
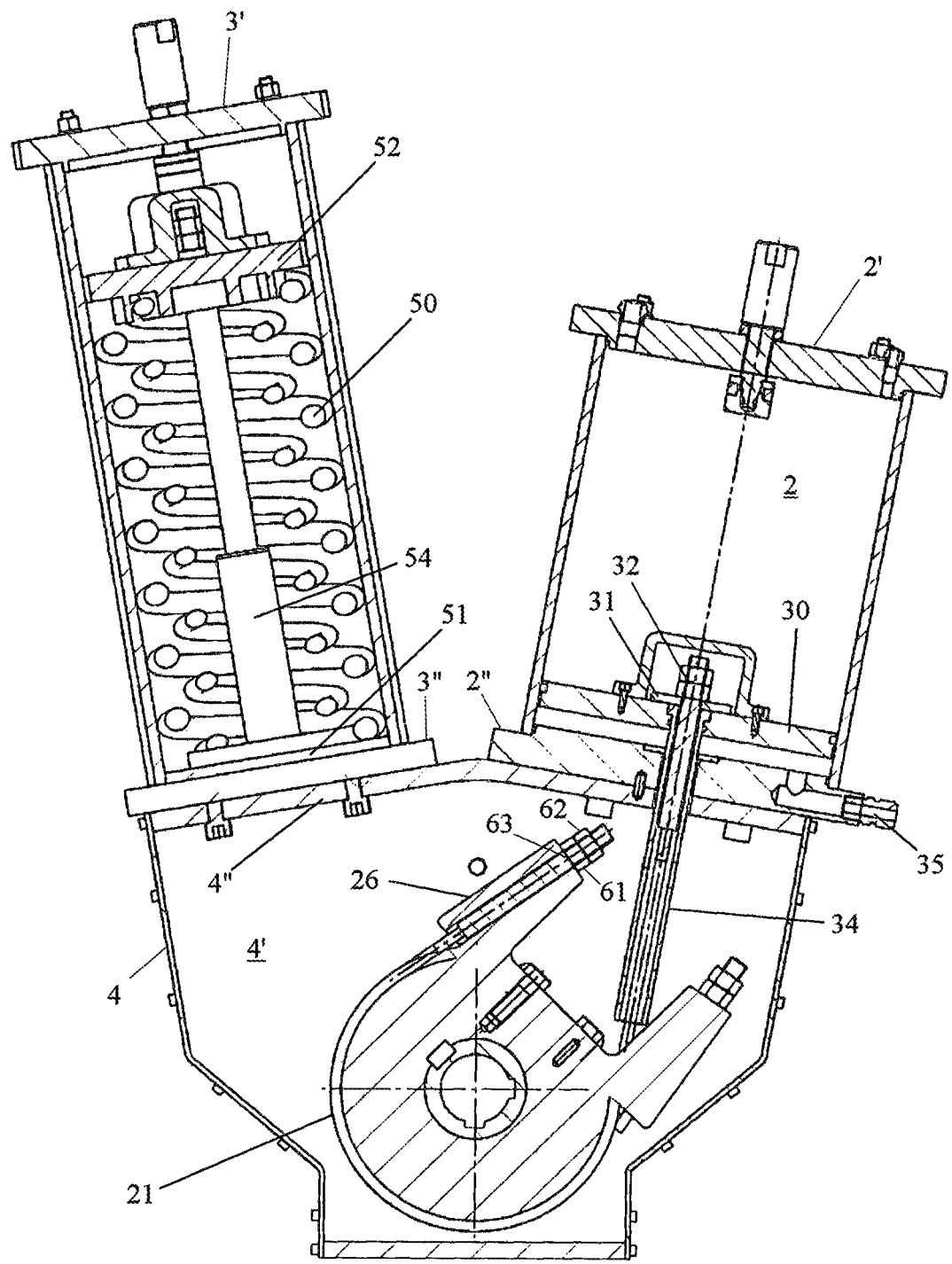
FIG. 17 illustrates an embodiment of the invention having a binding element integral with the pulley.

The graphics of FIG. 15 compares the performance of such an embodiment with feeder conduits opposed at 180° with the performances of the solution in which the two conduits are parallel between them. In fact, it is highlighted how, for increasing values of pressure applied and by increasing the angle of rotation of the pulley, the performance of the solution at 180° is always constant. On the contrary, for the solution with parallel conduits there is a strongly decreasing course.

The graphics from FIG. 9 to FIG. 12 show some experimental data obtained by comparing an actuator with wires and an actuator with crank and slotted link having identical feeder conduits: direct with air and antagonist with spring assembly.

Figure 9:
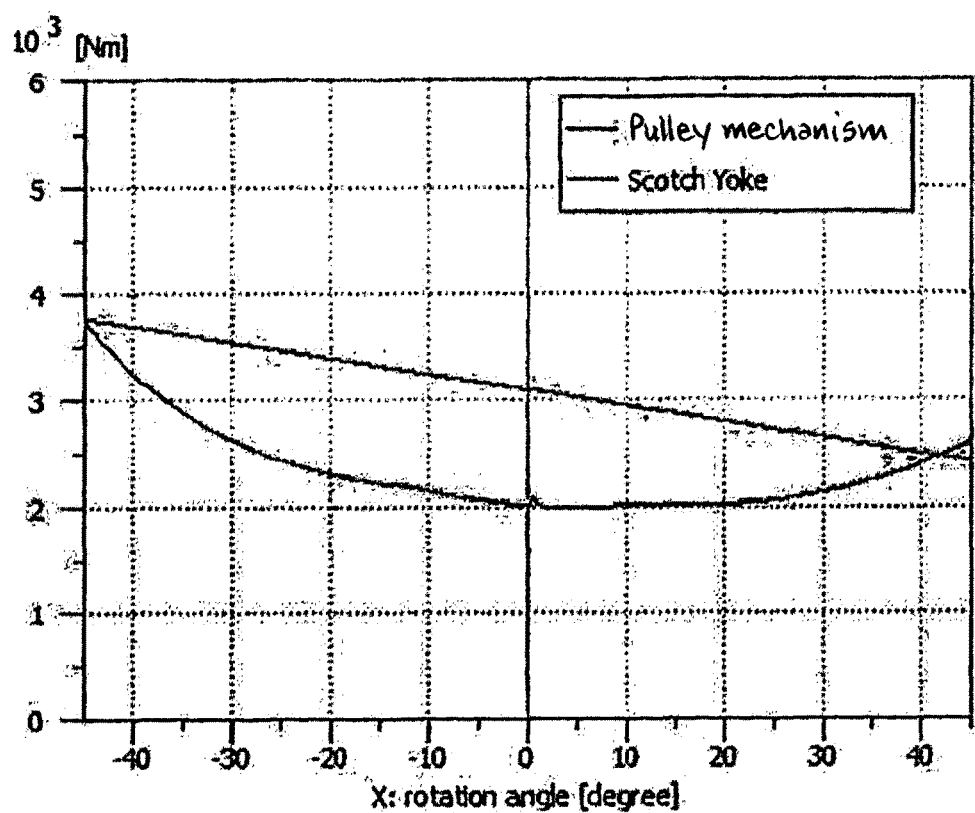
FIGS. 9 to 12 show comparative graphics to highlight the advantages in the use of the present solution.

For example, FIG. 9 shows a comparison of course of the pair on the basis of the angle of rotation and highlights precisely that the solution with pulley has a much more linear course with respect to the solution with crank and slotted link when the rotation varies and this is important because it allows precise controls also on the intermediate positions.

Figure 10:
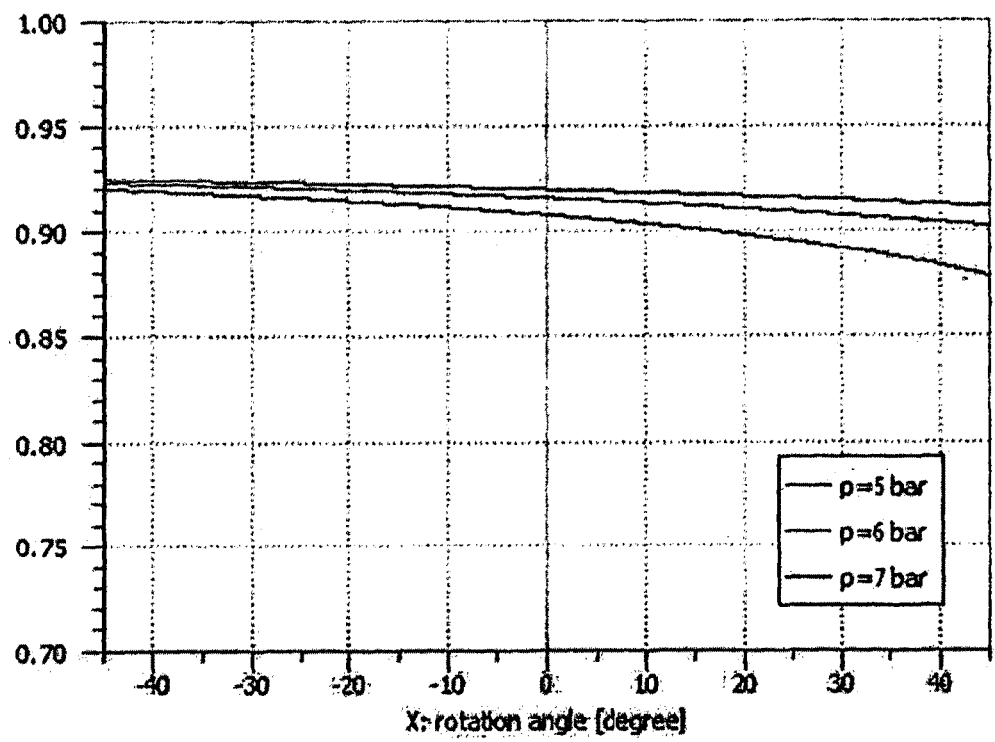

FIG. 10 shows in a graphics the performance of the pulley system when the pressure of exercise varies. It can be seen how the performance is quite linear and differs not much when the pressure varies. A totally opposite situation is instead with the solution with crank and slotted link, which has a strongly oscillating performance.

Figure 11:
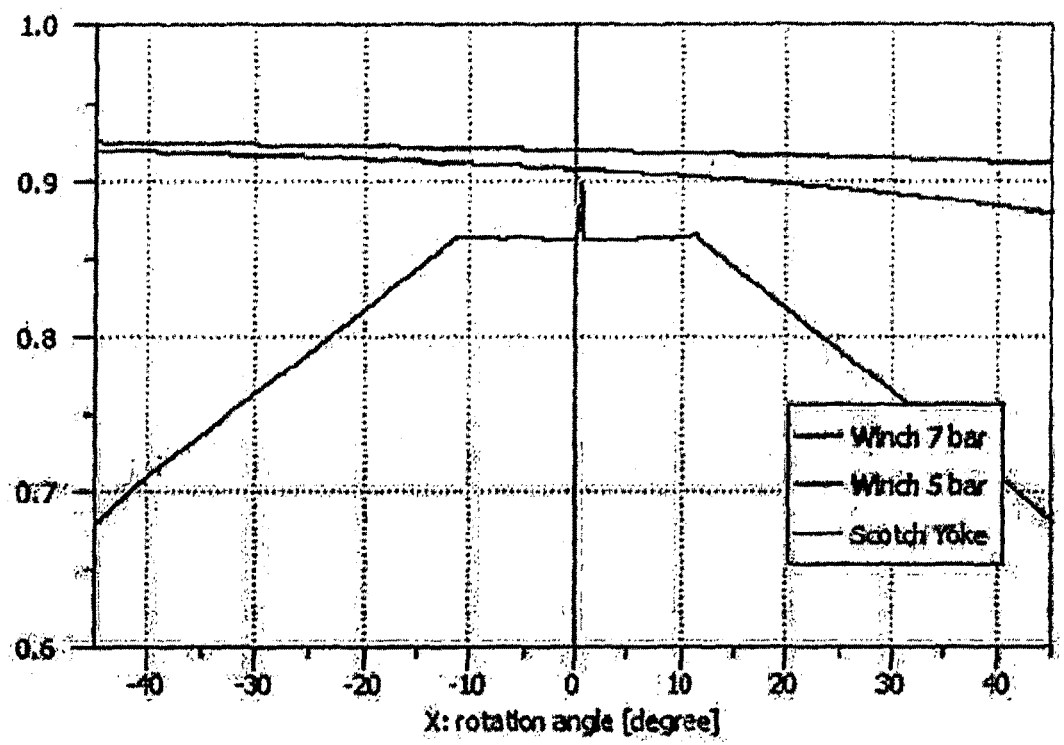

FIG. 11 shows a comparison between a performance of the pulley system with that with crank and slotted link and it can be seen that the performance of the pulley system is greater and above all quite linear with a minimum decrease when the angle of rotation increases.

Figure 12:
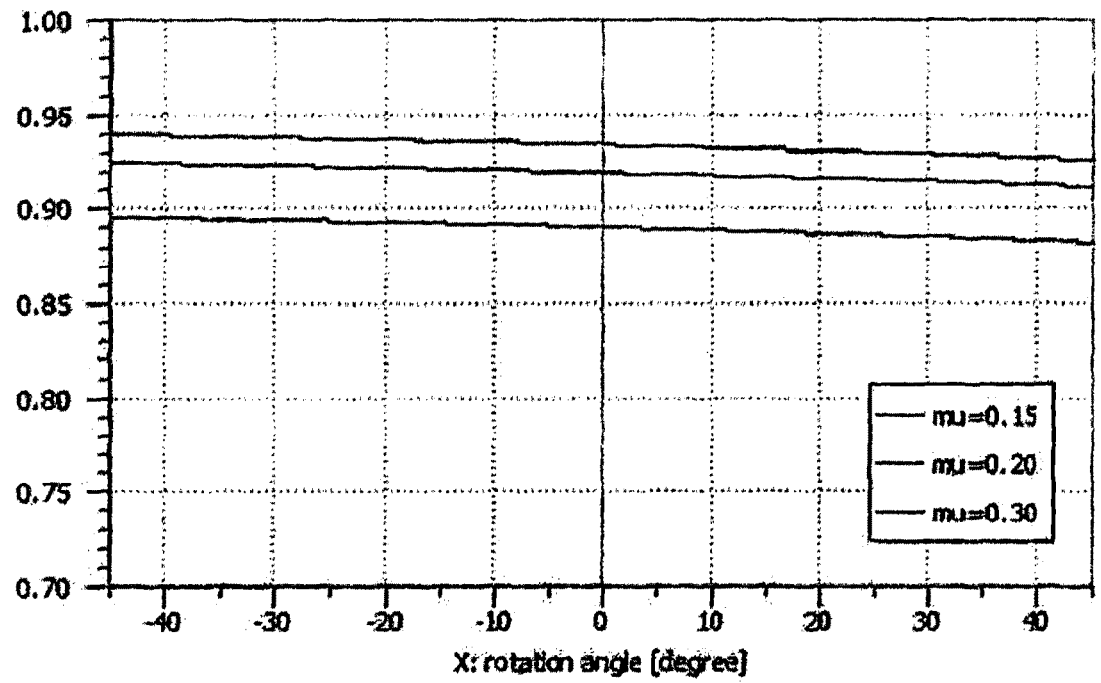

FIG. 12, last, shows a performance of the pulley system when the coefficient of friction (mu) varies and it is seen in fact that it has a linear course with minimal variations when the friction increases. This is a very important aspect because it means that the system is not much more resistant to wear and is not influenced by the friction. It lends itself very well, therefore, to the control of the intermediate positions.

In the present description, the term wire is intended in a very generic way, including wires of any nature, size and section (circular, quadrangular, etc.), for example steel wires or wires of other metallic and non-metallic material, as well as fabric wires, rubber wires (similar to the belts for pulleys) and the like, tapes and strips.

In the present description, by pulley is intended in a generic way rotatable disks (or of other forms) not necessarily provided with a throttle for the passage of the wire and anyway having a contact surface with a substantially flat belt.

The invention claimed is:

1. A device (1) for controlling a position of a rotary valve, comprising:
   a rotatable element (11) disposed in a housing (4) and configured to control the position of the rotary valve based on a rotation in a direction or in an opposite direction; and
   means (21, 22, 30, 50, 54, 52) to cause said rotation of the rotatable element (11), said means comprising,
   a first and a second antagonist feeder conduits (2, 3) coupled to the housing, said first and second antagonist feeder conduits (2, 3) each respectively having first and second upper plates (2', 3') and first and respectively second bottom plates (2", 3"), the first and second bottom plates being disposed on the housing (4);
   a first septum (30) slidingly disposed inside the first feeder conduit to have a linear motion by action of a pressurized fluid injected between the first septum (30) and the bottom plate (2'),
   a second septum (52) slidingly disposed to have a linear motion inside the second feeder conduit, and
   a biasing member arranged between the second septum (32) and the second bottom plate and acting on the second septum to cause the second septum to return to an initial position after the first feeder conduit is depressurized,
   wherein said rotatable element (11) is a pulley and said means (21, 22, 30, 50, 54, 52) further comprises a wire (21, 22) anchored to the pulley and to said first and said second septa to cause a rotation in a direction or in an opposite direction of the pulley due to application of a pre-determined traction on the wire obtained through the linear motion generated by said first and second feeder conduits, and
   wherein no pressurized fluid is injected between the first and respectively the second upper plates and the first and respectively the second septum.

2. The device (1), as per claim 1, wherein there is a single wire (21, 22) having two ends and connected directly to the pulley in an area comprised between said two ends.

3. The device (1), as per claim 1, wherein there are two wires (21, 22) each having a first end connected directly to the pulley and a second end anchored onto the first and respectively the second septum.

4. The device (1), as per claim 1, further comprising a binding element (20) connected to the pulley or integral to the pulley, wherein there are two wires (21, 22) each having an end connected to the binding element.

5. The device (1), as per claim 4, wherein the pulley has a smoothed portion for fixing of said binding element (20) when said binding element is not integral to the pulley.

6. The device (1), as per claim 1, wherein said pulley comprises two throttles (21', 22') and one wire (21, 22) for each throttle.

7. The device (1), as per claim 1, wherein said biasing member is arranged to work under traction or under compression.

8. The device (1), as per claim 1, wherein, when the biasing member is configured as a compression spring.

9. A device (1), as per claim 1, wherein the first and the second septa are antagonist to one another due to two wires (21, 22), and wherein one of the two wire is fixed to the second septum (52) at one end and to the pulley (11) at an opposite end and the other one of the two wires is fixed to the first septum (30) at one end and to the pulley (11) at an opposite end.

10. The device (1), as per claim 1, wherein said first (2) and said second antagonist feeder conduits (3) are placed according to a divarication angle comprised between 10 degrees and 180 degrees.

11. The device (1), as per claim 1, wherein said first and said second antagonist feeder conduits are placed in an opposed position, according to a divarication angle of 180 degrees.

\* \* \* \* \*